United States Patent [19]
Shimp

[11] 4,237,486
[45] Dec. 2, 1980

[54] COMPATIBLE TRANSMISSION OF AN ENCODED SIGNAL WITH A TELEVISION

[75] Inventor: Richard L. Shimp, Waynesboro, Va.
[73] Assignee: ComSonics, Inc., Harrisonburg, Va.
[21] Appl. No.: 959,277
[22] Filed: Nov. 9, 1978
[51] Int. Cl.³ .............................................. H04N 7/08
[52] U.S. Cl. ..................................... 358/142; 370/11
[58] Field of Search ................... 358/142, 141; 375/42, 375/60; 455/61, 91; 370/19, 11, 6

[56] References Cited

U.S. PATENT DOCUMENTS

| | | | |
|---|---|---|---|
| 2,512,530 | 6/1950 | O'Brien et al. | 370/11 |
| 3,032,717 | 5/1962 | Fowler et al. | 370/11 |
| 3,626,417 | 12/1971 | Gilbert | 370/11 |
| 3,740,649 | 6/1973 | Itoh | 455/91 |

*Primary Examiner*—Richard Murray
*Attorney, Agent, or Firm*—C. Lamont Whitman

[57] ABSTRACT

A method and apparatus of compatibly and simultaneously transmitting and receiving an encoded signal with the normal visual and aural carrier of a television signal is disclosed. The encoded signal is used as a modulating signal to frequency modulate the visual carrier frequency signal prior to amplitude modulating the visual carrier frequency signal with a source of composite video signals. Normally, the introduction of additional sideband power even in the form of constant amplitude components will cause visual distortion to a received picture due to the normal Nyquist shaped bandpass characteristics of the intermediate frequency amplifier in the television receiver. This distortion is reduced or eliminated in several ways. The maximum allowable frequency modulation deviation can be limited so that the visual distortion is substantially reduced. Where greater frequency modulation deviation is required, the interfering beats which appear as horizontal lines are made less visable by adjusting the frequency modulation deviation so that these lines roll vertically at a maximum rate. A more desirable approach is to amplitude predistort the frequency modulated visual carrier frequency signal in a complimentary mode to the slope of the video intermediate frequency amplifier circuits of the television receiver. In this manner, an incidental amplitude modulation would be added to the television visual carrier at the transmitter, and this incidental amplitude modulation is in the opposite polarity of the slope of the modulation taking place in the receiver. In other words, by predistorting the frequency modulated visual carrier frequency signal, the signal is in effect pre-equalized to the Nyquist bandpass characteristics of the television receiver intermediate frequency amplifier. The predistortion of the frequency modulated visual carrier signal may be accomplished passively with a bandpass filter having its lower frequency slope at the television picture carrier frequency and having bandpass response characteristics which are complimentary to the Nyquist bandpass characteristics of the television receiver intermediate frequency amplifier. Instead of a passive bandpass filter, similar results are obtained by active, pre-equalizing circuits in the transmitter. Specifically, a phase opposite correction signal derived from the encoded signal is added to the composite video signal prior to amplitude modulating the frequency modulated visual carrier frequency signal. In any case, normal aural carrier generation methods avoid any interference by the addition of a frequency deviation of the visual carrier. The received signal is detected to separately reproduce the encoded signal.

49 Claims, 5 Drawing Figures

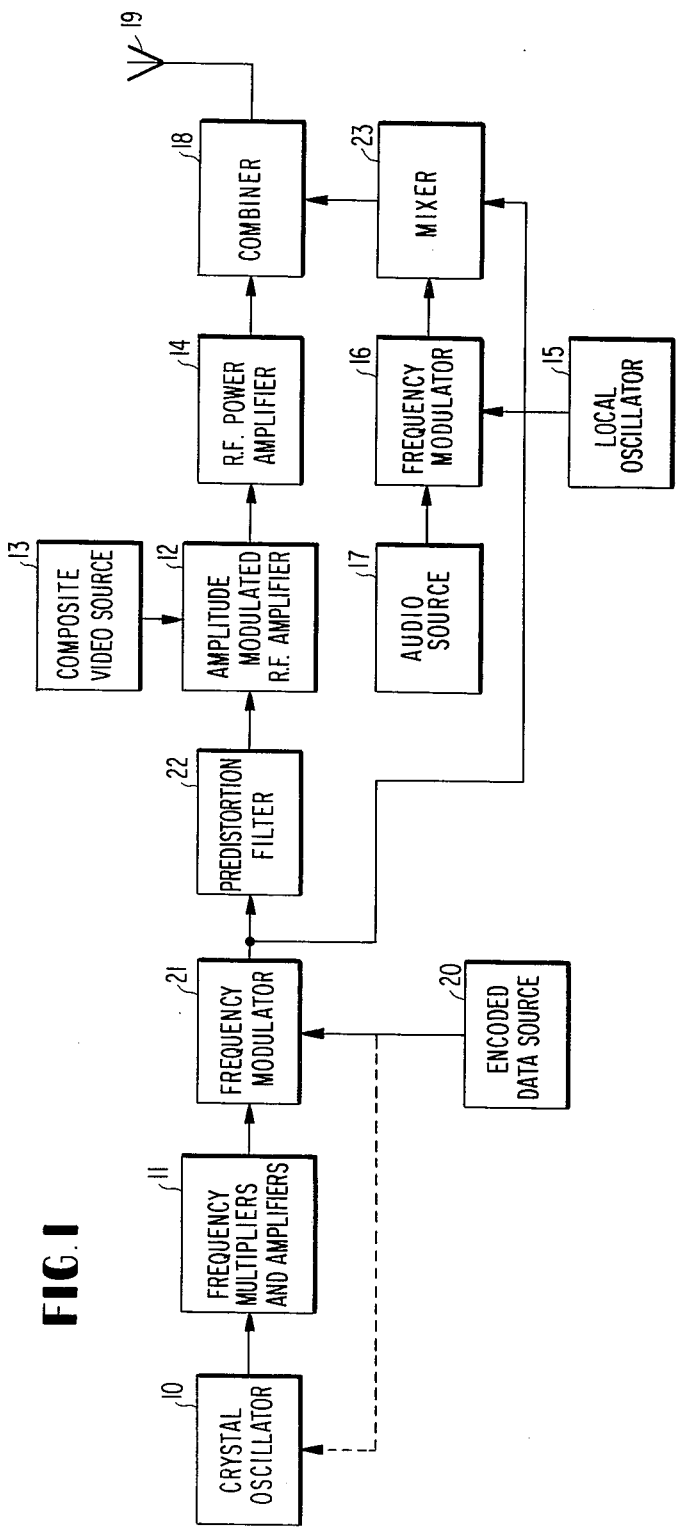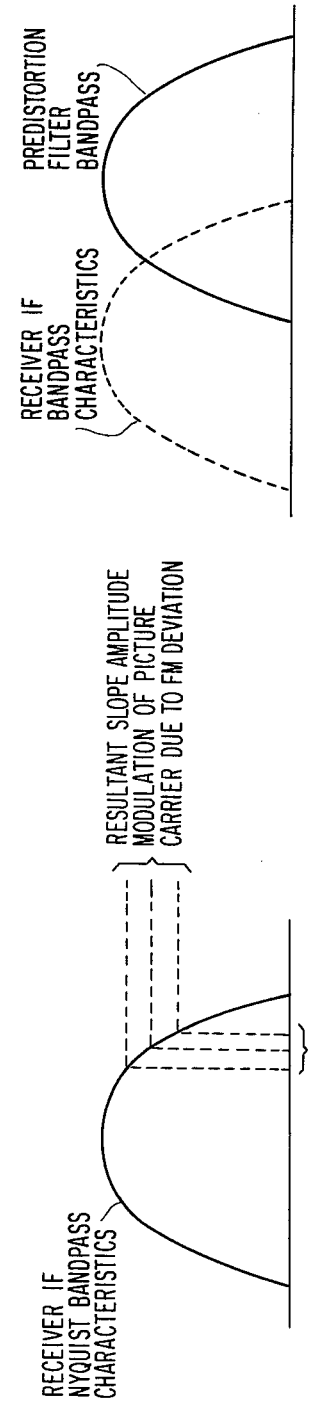

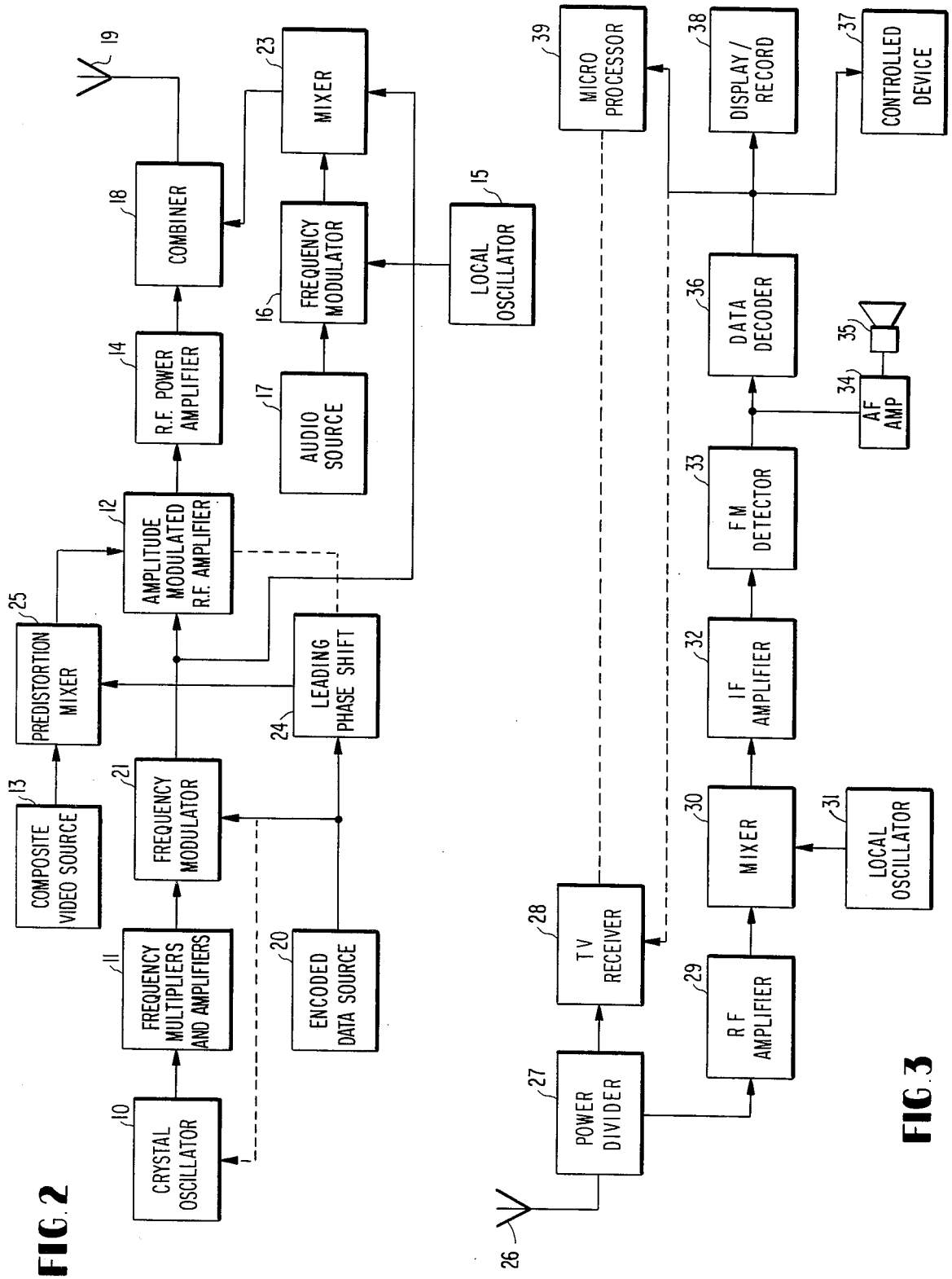

COMPATIBLE TRANSMISSION OF AN ENCODED SIGNAL WITH A TELEVISION

SUMMARY OF THE INVENTION

The present invention generally relates to signalling systems, and more particularly to a method and apparatus of compatibly transmitting and receiving an encoded signal with the normal visual and aural carrier of a television signal.

According to the present invention, a deliberate controlled frequency deviation of the master carrier oscillator is caused at a rate proportional to the intelligence which is desired to be transmitted. If this frequency deviation is limited, little or no visual distortion is caused to the received picture. However, as the frequency deviation is increased, the additional sideband power which results causes a visual distortion in the form of horizontal lines. This is due to the normal Nyquist shaped bandpass characteristics of the intermediate frequency amplifier of the receiver. The Nyquist shaped bandpass characteristics produce what is commonly referred to as "haystack" response. This "haystack" response causes a slope demodulation of the sideband power even when that sideband power is in the form of constant amplitude components. The interferring beats which produce the horizontal lines can be made less visual by purposely making the lines to roll vertically at a maximum rate. A better solution, however, is to predistort the transmitted signal so that it is pre-equalized to the bandpass characteristics of the intermediate frequency amplifier circuits of the television receiver. One way this may be accomplished is to amplitude predistort the frequency modulated visual carrier frequency signal in a complimentary mode to the slope of the video intermediate frequency amplifier circuits of the television receiver. This amplitude predistortion may be accomplished with a bandpass filter having its lower frequency slope at the television picture carrier frequency and having a complimentary response characteristic to that of the television receiver intermediate frequency amplifier circuits. In general, this predistortion bandpass filter is a passive filter but may be adjustable so as to optimize the cancellation of any interferring components at the television receiver.

Instead of a passive bandpass filter, an active pre-equalization circuit may also be used. In this case, a phase opposite correction signal derived from the encoded signal is added to the composite video signal prior to amplitude modulating the frequency modulated visual carrier frequency signal. The amplitude and phase of the correction signal may be adjusted so that the amplitude variations which would occur in a television receiver due to the Nyquist response characteristics of the receiver are pre-equalized. In any case, the normal aural carrier generation method avoid any interference by the addition of the frequency deviation of the visual carrier. This is accomplished by making the difference of the aural carrier and the sum of the visual carrier plus frequency deviation equal to 4.5 MHz at all times. Since the television receiver derives sound by comparing the instantaneous difference between the visual and aural carriers, the deliberate introduction of frequency modulation to the visual carrier causes an identical shift of the aural carrier consequently causing no instantaneous difference detectable by the receiver's ratio detector.

The received signal is applied to a standard television receiver which detects the composite video and aural signals in the normal manner. In addition, the received signal is separately applied to a receiver which is designed to detect the frequency modulation of the visual carrier frequency signal to reproduce the encoded signal. The detected encoded signal may be aurally reproduced if the encoded signal is a test signal, or decoded if the encoded signal is a data signal.

The system has many applications and is particularly useful when applied to CATV systems. For example, in my earlier U.S. Pat. No. 4,072,899, I described an RF leak detector which is useful in detecting RF leaks due to defects in the shielding in a CATV coaxial cable distribution network. The present system also readily lends itself to this particular application. Specifically, a unique audio tone can be used as the encoded signal which frequency modulates the visual carrier frequency signal. A simple FM receiver tuned to detect and aurally reproduce this unique signal can then be used by a technician in the field to inspect the CATV coaxial cable distribution network and detect small amounts of RF leakage.

Perhaps one of the most promising applications for the system according to the present invention is in the transmission of digitally encoded data with the television signal. This has applications in both CATV systems and broadcast television systems. For example, the digitally encoded data may be either information or control commands. The control commands can be applied to any device which is capable of responding to those commands including the television receiver itself. Of course, it may only be desired to either display or record signals if the encoded data represents information. For example, stock market quotations, weather reports, news items and other such information could be digitally encoded, transmitted with the television signal and separately displayed and/or recorded. In some applications it may even be desirable to display the information on the television receiver's screen. Otherwise, a separate video screen, printer or other like device can be used to provide the information output terminal.

Another application of the present invention is in the area of educational television. Owing to the ability to transmit digitally encoded data with the television signal, the random access memory (RAM) of a microprocessor could be loaded with a program designed for the specific educational program which is to be broadcast. Once the microprocessor is thus programmed, the microprocessor with an associated keyboard in combination with the standard television receiver becomes an effective educational tool. Obviously, any digital data communications which it may be desired to effect over a television channel is facilitated by the invention.

BRIEF DESCRIPTION OF THE DRAWINGS

The foregoing and other objects, advantages and uses of the invention will become more apparent from the following detailed description with reference to the accompanying drawings, in which:

FIG. 1 is a block diagram of a television transmitter embodying the principles of the invention and illustrating one way to compensate for the slope demodulation in the receiver intermediate frequency amplifier circuits;

FIG. 1A is a graph illustrating a typical television receiver intermediate frequency Nyquist bandpass characteristics and showing the resultant slope amplitude modulation of the picture carrier due to a frequency deviation;

FIG. 1B is a graph illustrating the bandpass characteristics of the predistortion filter used in the transmitter of FIG. 1 as contrasted with the receiver intermediate frequency bandpass characteristics;

FIG. 2 is a block diagram of another transmitter employing the principles of the present invention but using pre-equalization circuits for the purpose of cancelling the effects of the television receiver intermediate frequency Nyquist bandpass characteristics; and FIG. 3 is a block diagram of a receiver employing both a conventional television receiver and a separate receiver for detecting the encoded signal, and FIG. 3 further illustrates various alternatives for the use of the detected encoded signal.

DETAILED DESCRIPTION OF THE INVENTION

Referring now to FIG. 1 of the drawings, the transmitter includes a frequency stable source of oscillations such as a crystal oscillator 10. The output of crystal oscillator 10 is supplied to frequency multipliers and amplifiers 11 which generate the visual carrier of the television signal. This visual carrier is ultimately supplied to an amplitude modulator which may be an amplitude modulated radio frequency amplifier 12. Amplitude modulation of the visual carrier is accomplished by varying the gain of the radio frequency amplifier with a signal derived from the composite video source 13. The amplitude modulated visual carrier is then amplified by radio frequency power amplifier 14.

A local oscillator 15 generates an aural carrier separated in frequency from the visual carrier by 4.5 MHz, and this carrier is frequency modulated in frequency modulator 16 by a signal from audio source 17. The frequency modulated aural carrier from frequency modulator 16 is combined with the amplitude modulated visual carrier from radio frequency power amplifier 14 in combiner 18 and transmitted by common antenna system 19. It will be understood, however, that a cable television distribution network can be substituted for the antenna system 19.

Those skilled in the art will recognize that the transmitter thus far described is completely conventional. According to the present invention, a signal from encoded data source 20 is used to cause a deliberate controlled frequency deviation of the visual carrier at a rate proportional to the intelligence which is represented by the encoded data. This may be accomplished by supplying the visual carrier from the frequency multipliers and amplifiers 11 to frequency modulator 21 which frequency modulates the visual carrier with a signal from the encoded data source 20. Alternatively, the frequency deviation may be deliberately introduced by the simple addition of a voltage variable impedance device, such as a vari-cap or the equivalent, in parallel with the frequency determining device, normally a crystal, in oscillator 10, if the frequency determining device is operated in the parallel resonant mode. Series resonant operation of the crystal limits the amount of deviation obtainable; therefore, the design of the oscillator 10 should be for parallel resonance if a signal from the encoded data source 20 is applied directly to the oscillator.

If the frequency modulation deviation is sufficiently great (greater than approximately 200 Hz), a visible beat in the form of horizontal lines will appear in the television picture. This is a result of the slope modulation of the television picture carrier in the television receiver video intermediate frequency amplifier circuitry due to the frequency modulation of the visual carrier. This can best be illustrated in FIG. 1A which shows the typical receiver intermediate frequency Nyquist bandpass response characteristic. Because of the generally rounded shape of this curve, the bandpass characteristic of the intermediate frequency amplifier is commonly referred to as "haystack" response. As can be seen from the illustration, the introduction of additional sideband power even in the form of constant amplitude components will cause a visual distortion to the received picture due to the slope amplitude modulation of the picture carrier due to the frequency modulation deviation of the visual carrier. More specifically with reference to FIG. 1A, as the visual carrier is moved back and forth along the abscissa, the amplitude of the carrier along the ordinate increases and decreases to produce an interferring amplitude modulation of the visual carrier in the television receiver itself. The visual beat in the television picture can be made to "stand still" or roll vertically by adjusting the frequency of the frequency modulation. The horizontal lines appear to "stand still" when the frequency modulation is at a multiple of the vertical television sweep frequency. For example, the "stand still" condition exists for a frequency modulation frequency of 1020 Hz which is equal to 17×60 Hz. The interferring beats are less visible if the lines are purposely made to roll vertically at a maximum rate. If this approach is taken, than it is necessary to carefully select the frequency modulation tone representing the encoded data to minimize the visibility of the lines in the television picture.

An alternative approach and one which is illustrated in FIG. 1 is to predistort the visual carrier to, in effect, pre-equalize the television signal to the response characteristic of the receiver intermediate frequency amplifier circuit. This is accomplished by inserting a predistortion filter 22 between the frequency modulator 21 and the amplitude modulated radio frequency amplifier 12. This predistortion filter is a bandpass filter which is aligned to place its lower frequency slope at the visual carrier frequency being used. With reference to FIG. 1B, there is shown in dotted line the receiver intermediate frequency bandpass characteristic which is the same as that shown in FIG. 1A, and in solid line, the bandpass characteristic of the predistortion filter 22. These two characteristic curves intersect at the visual carrier frequency. Thus, it will be appreciated that the bandpass characteristic of the predistortion filter 22 add in effect an amplitude predistortion in a complimentary mode to the slope of the video intermediate frequency amplifier circuits in the television receiver. The net result, of course, is a cancellation of the slope amplitude modulation by the receiver intermediate frequency amplifier circuits of the picture carrier due to the frequency modulation deviation.

Normal aural carrier generation methods avoid any interference by the addition of the frequency deviation of the visual carrier. As may be seen in FIG. 1, the frequency modulated aural carrier and the frequency modulated visual carrier are mixed in a mixer 23, the output of which is supplied to the combiner 18. In this manner, the aural carrier and the sum of the visual carrier plus frequency deviation is made equal to 4.5 MHz at all times. Since the television receiver derives sound by comparing the instantaneous difference between the visual and aural carriers, the deliberate introduction of frequency modulation to the visual carrier causes an identical shift of the aural carrier consequently causing no instantaneous difference detectable by the receiver's ratio detector.

While the approach used in FIG. 1 is a good one, there at present exists a problem that the response characteristics of the intermediate frequency amplifier circuits of all television receivers are not identical. Therefore, it is necessary to adjust the predistortion of the frequency modulated visual carrier to provide a "best match" for the television receivers in any given broadcast system. This may be accomplished by making the predistortion bandpass filter 22 adjustable in its response characteristics. It is, however, difficult to effect much adjustment in the bandpass characteristics of a passive filter. Therefore, the active pre-equalization circuit shown in FIG. 2 may be substituted for the predistortion filter to allow a greater adjustment of the pre-equalization of the transmitted signal.

With specific reference to FIG. 2 wherein like reference numerals designate identical components to those illustrated in FIG. 1, the output of the encoded data source is supplied to a leading phase shift circuit 24 which may be adjustable over a fairly large range. The output of the leading phase shift circuit 24 is supplied together with the output of the composite video source 13 to a predistortion mixer 25 to, in effect, pre-equalize the modulating signal to the amplitude modulated radio frequency amplifier 12. Alternatively, the predistortion mixer 25 can be eliminated and the output of the leading phase shift circuit 24 supplied to a biasing input to the amplitude modulated radio frequency amplifier 12 to produce the same result.

Referring now to FIG. 3, the transmitted television signal is received by the antenna 26 and supplied to a power divider 27. Again, it is emphasized that in place of the antenna 26, there may instead be a cable television distribution network. The output of the power divider 27 is supplied on the one hand to a conventional television receiver 28 which reproduces the picture and audio information in the normal manner. In other words, the practice of the present invention requires absolutely no modification to the conventional television receiver. However, in order to receive and detect the encoded data signal which is transmitted with the television signal, a separate receiver is required. Thus, the power divider 27 supplies on the other hand an output to the encoded data receiver.

The encoded data receiver is of conventional super heterodyne construction comprising a radio frequency amplifier 29 which supplies an amplified signal to the mixer 30 and local oscillator 31 to produce an intermediate frequency signal. This intermediate frequency signal is amplified and limited in intermediate frequency amplifier 32 to provide an output to frequency modulation detector 33 such as a ratio detector or discriminator. The output of the frequency modulation detector is the encoded data at audio frequency.

At this point, the encoded data may be used in any of a number of applications. One particularly useful application is to detect radio frequency leaks due to defects in the shielding of a CATV coaxial cable distribution network. In this application, a unique audio tone is used as the encoded signal which frequency modulates the visual carrier frequency signal. This unique audio tone, which may have a "warbling" sound for easy detection by a technician in the field, is detected by the frequency modulation detector 33 and amplified in an audio frequency amplifier 34 to drive a loud speaker 35 or head phones. In this application, it will be appreciated that the power divider 27 and television receiver 28 are not required. In other words, a simple FM receiver tuned to detect and aurally reproduce the unique signal which is transmitted as the encoded data signal with a television signal is all that would be used by the technician in the field for the purpose of checking and detecting small amounts of RF leakage in a CATV coaxial cable distribution network.

The present invention is uniquely capable of transmitting digitally encoded data with the television signal. This has applications in both CATV systems and broadcast television systems. The digitally encoded data may be either information or control commands. In either case, the encoded signal from the frequency modulation detector 33 is supplied to a data decoder 36. The form of the data decoder 36 will vary depending upon the manner in which the data was originally encoded. For example, if alpha-numeric characters are encoded as binary signals, then the decoder 36 performs the reverse code conversion. It is possible that the binary encoded signals may be supplied directly to a utilization device, in which case the data decoder 36 would be simply replaced by pulse shaping and amplifier circuits to provide a clean output signal to the utilization device.

If the encoded signals are control commands, these control commands can be supplied from the data decoder 36 to any device 37 which is capable of responding to those commands. For example, in a CATV coaxial cable distribution network, it may be desirable to control downstream circuitry in the distribution network itself from the head end. In a broadcast system, the control device 37 may be totally unrelated to the television program being broadcast, in which case the power divider 37 and television receiver could again be eliminated. Such an application might be in a security system. Of course, the control commands could be used to control the television receiver 28 instead of some unrelated control device.

If the encoded data is information as opposed to control commands, the decoded data from the data decoder 36 may be supplied to some suitable display and/or recording device 38. For example, stock market quotations, weather reports, news items and other such information could be digitally encoded, transmitted with the television signal and separately displayed and/or recorded. With suitable modifications of the television receiver 28, it is possible in some applications to display the decoded information directly on the television receiver's screen. Otherwise, a separate video screen, printer or other like device can be used as the information output terminal 38. Again, if the encoded information is unrelated to the television program being broadcast, the power divider 27 and television receiver 28 may be eliminated.

The transmission of digital data permits communications between digital data processors. In the case of the present invention, one way communication between a central processing unit and a plurality of satellite processors is possible. One specific application of this capability is in the area of educational television. A conventional microprocessor 39 having a keyboard and a display or other appropriate input/output devices for communicating with an operator/student may be provided. The microprocessor may be provided with a random access memory (RAM) which is first loaded with a program desired to be used with specific educational material. When applied to educational television, this program can be transmitted in a relatively short period of time at the beginning of the television program as the encoded data which is transmitted with the television signal. The encoded data is decoded by the data decoder 36 and supplied to the RAM of the microprocessor 39. Once the microprocessor is thus programmed, the microprocessor in combination with the television receiver 28 becomes an effective educational tool.

As will be appreciated by those skilled in the art, the overall concept of the present invention is based on the ability to cause deliberate controlled frequency deviation of the visual carrier at a rate proportional to the intelligence which is desired to be transmitted with the television signal. In order to reduce or eliminate the visual beats in the form of horizontal lines on the television picture, the modulating frequency tones can be chosen so that the horizontal lines roll vertically at a maximum rate, or the transmitted signal can be pre-equalized to the bandpass characteristics of the intermediate frequency amplifier circuits of the television receiver, or both. In other words, selection of tones to cause the horizontal lines in the television picture to roll vertically at a maximum rate and the pre-equalization of the transmitted signal are not necessarily mutually exclusive interference reduction techniques. On the contrary, it may be very desirable in some applications to combine these two techniques recognizing that television receiver intermediate frequency amplifier circuit bandpass characteristics vary from receiver to receiver so that perfect pre-equalization cannot be achieved. The applications of the invention which have been described are by way of nonlimiting example, and other applications will be apparent to those skilled in the art.

What is claimed is:

1. A method of compatibly and simultaneously transmitting an encoded signal with the normal visual carrier of a television signal comprising the steps of
   generating a visual carrier frequency signal,
   frequency modulating the visual carrier frequency signal over a narrow bandwidth with a source of encoded signal,
   amplitude modulating the frequency modulated visual carrier frequency signal with a source of composite video signals, and
   transmitting the frequency and amplitude modulated visual carrier frequency signal.

2. A method of compatibly and simultaneously transmitting an encoded signal with the normal visual carrier of a television signal comprising the steps of
   generating a visual carrier frequency signal,
   frequency modulating the visual carrier frequency signal with audio tones selected according to a source of encoded signal, said audio tones having frequencies which are substantially different than multiples of the television vertical sweep frequency,
   amplitude modulating the frequency modulated visual carrier frequency signal with a source of composite video signals, and
   transmitting the frequency and amplitude modulated visual carrier frequency signal.

3. A method of compatibly and simultaneously transmitting an encoded signal with the normal visual carrier of a television signal comprision the steps of
   generating a visual carrier frequency signal,
   frequency modulating with the visual carrier frequency signal over a narrow bandwidth with a source of encoded signal,
   amplitude predistorting the frequency modulated visual carrier frequency signal in a complimentary mode to the slope of the video intermediate frequency circuit of a television receiver,
   amplitude modulating the frequency modulated and predistorted visual carrier frequency signal with a source of composite video signals, and
   transmitting the frequency and amplitude modulated visual carrier frequency signals.

4. A method of compatibly and simultaneously transmitting an encoded signal with the normal visual carrier of a television signal comprision the steps of
   generating a visual carrier frequency signal,
   frequency modulating the visual carrier frequency signal over a narrow bandwidth with a source of encoded signal,
   amplitude modulating the frequency modulated visual carrier frequency signal with a source of composite video signals,
   adding a phase opposite correction signal to the composite video signals prior to amplitude modulating the frequency modulated visual carrier frequency signal such that amplitude variations which would occur in a television receiver due to the response characteristics of the receiver are pre-equalized, and
   transmitting the frequency and amplitude modulated visual carrier frequency signal.

5. A method of compatibly and simultaneously transmitting an encoded signal with the normal visual carrier of a television signal comprising the steps of
   generating a visual carrier frequency signal,
   frequency modulating the visual carrier frequency signal over a narrow bandwidth with a source of encoded signal,
   phase shifting and adding the encoded signal to a composite video signal to produce a pre-equalized signal,
   amplitude modulating the frequency modulated visual carrier frequency signal with the pre-equalized signal, and
   transmitting the frequency and amplitude modulated visual carrier frequency signal.

6. A method of compatibly and simultaneously transmitting an encoded signal with the normal visual carrier of a television signal comprising the steps of
   generating a visual carrier frequency signal,
   frequency modulating the visual carrier frequency signal over a narrow bandwidth with a source of encoded signal,
   amplitude modulating in an amplitude modulator the frequency modulated visual carrier frequency signal with a source of composite video signals,
   applying a variable bias signal to the amplitude modulator, said variable bias signal being derived from the source of encoded signal with a leading phase shift, and
   transmitting the frequency and amplitude modulated visual carrier frequency signal.

7. The method of transmitting recited in claim 6 further comprising the step of adjusting the phase shift of the variable bias signal to eliminate interference in a demodulated composite video signal in a television receiver.

8. A method of compatibly and simultaneously transmitting an encoded signal with the normal visual carrier of a television signal comprising the steps of
generating a visual carrier frequency signal,
frequency modulating the visual carrier frequency signal with audio tones selected according to a source of encoded signal, said audio tones having frequencies which are substantially different than multiples of the television vertical sweep frequency,
amplitude predistorting the frequency modulated visual carrier frequency signal in a complimentary mode to the slope of the video intermediate frequency circuit of a television receiver,
amplitude modulating the frequency modulated and predistorted visual carrier frequency signal with a source of composite video signals, and
transmitting the frequency and amplitude modulated visual carrier frequency signals.

9. A method of compatibly and simtultaneously transmitting an encoded signal with the normal visual carrier of a television signal comprising the steps of
generating a visual carrier frequency signal,
frequency modulating the visual carrier frequency signal with audio tones selected according to a source of encoded signal, said audio tones having frequencies which are substantially different than multiples of the television vertical sweep frequency,
amplitude modulating the frequency modulated visual carrier frequency signal with a source of composite video signals,
adding a phase opposite correction signal to the composite video signals prior to amplitude modulating the frequency modulated visual carrier frequency signal such that amplitude variations which would occur in a television receiver due to the response characteristics of the receiver are preequalized, and
transmitting the frequency and amplitude modulated visual carrier frequency signal.

10. A method of compatibly and simultaneously transmitting an encoded signal with the normal visual carrier of a television signal comprising the steps of
generating a visual carrier frequency signal,
frequency modulating the visual carrier frequency signal with audio tones selected according to a source of encoded signal, said audio tones having frequencies which are substantially different than multiples of the television vertical sweep frequency,
phase shifting and adding said selected audio tones to a composite video signal to produce a pre-equalized signal,
amplitude modulating the frequency modulated visual carrier frequency signal with the pre-equalized signal, and
transmitting the frequency and amplitude modulated visual carrier frequency signal.

11. A method of compatibly and simultaneously transmitting an encoded signal with the normal visual carrier of a television signal comprising the steps of
generating a visual carrier frequency signal,
frequency modulating the visual carrier frequency signal with audio tones selected according to a source of encoded signal, said audio tones having frequencies which are substantially different than multiples of the television vertical sweep frequency,
amplitude modulating in an amplitude modulator the frequency modulated visual carrier frequency signal with a source of composite video signals,
applying a variable bias signal to the amplitude modulator, said variable bias signal being derived from the source of encoded signal with a leading phase shift, and
transmitting the frequency and amplitude modulated visual carrier frequency signal.

12. A method of compatibly and simultaneously transmitting an encoded signal with the normal visual and aural carrier of a television signal comprising the steps of
generating a visual carrier frequency signal,
frequency modulating the visual carrier frequency signal over a narrow bandwidth with a source of encoded signal,
amplitude modulating the frequency modulated visual carrier frequency signal with a source of composite video signals,
generating an aural carrier frequency signal,
frequency modulating the aural carrier frequency signal with an audio signal,
mixing the frequency modulated visual carrier frequency and aural carrier frequency signals to produce a resultant frequency modulated aural carrier frequency signal, and
combining and transmitting the frequency and amplitude modulated visual carrier frequency signal and the resultant frequency modulated aural carrier frequency signal.

13. A method of compatibly and simultaneously transmitting an encoded signal with the normal visual and aural carrier of a television signal comprising the steps of
generating a visual carrier frequency signal,
frequency modulating the visual carrier frequency signal with audio tones selected according to a source of encoded signal, said audio tones having frequencies which are substantially different than multiples of the television vertical sweep frequency,
amplitude modulating the frequency modulated visual carrier frequency signal with a source of composite video signals,
generating an aural carrier frequency signal,
frequency modulating the aural carrier frequency signal with an audio signal,
mixing the frequency modulated visual carrier frequency and aural carrier frequency signals to produce a resultant frequency modulated aural carrier frequency signal, and
combining and transmitting the frequency and amplitude modulated visual carrier frequency signal and the resultant frequency modulated aural carrier frequency signal.

14. A method of compatibly and simultaneously transmitting an encoded signal with the normal visual and aural carrier of a television signal comprising the steps of
generating a visual carrier frequency signal,
frequency modulating the visual carrier frequency signal over a narrow bandwidth with a source of encoded signal,
amplitude predistorting the frequency modulated visual carrier frequency signal in a complimentary mode to the slope of the video intermediate frequency circuits of a television receiver,
amplitude modulating the frequency modulated visual carrier frequency signal with a source of composite video signals,
generating an aural carrier frequency signal,
frequency modulating the aural carrier frequency signal with an audio signal,
mixing the frequency modulated visual carrier frequency and aural carrier frequency signals to produce a resultant frequency modulated aural carrier frequency signal, and
combining and transmitting the frequency and amplitude modulated visual carrier frequency signal and the resultant frequency modulated aural carrier frequency signal.

15. A method of compatibly and simultaneously transmitting an encoded signal with the normal visual and aural carrier of a television signal comprising the steps of
generating a visual carrier frequency signal,
frequency modulating the visual carrier frequency signal over a narrow bandwidth with a source of encoded signal,
amplitude modulating the frequency modulated visual carrier frequency signal with a source of composite video signals,
adding a phase opposite correction signal to the composite video signals prior to amplitude modulating the frequency modulated visual carrier frequency signal such that amplitude variations which would occur in a television receiver due to the response characteristics of the receiver are pre-equalized,
generating an aural carrier frequency signal,
frequency modulating the aural carrier frequency signal with an audio signal,
mixing the frequency modulated visual carrier frequency and aural carrier frequency signals to produce a resultant frequency modulated aural carrier frequency signal, and
combining and transmitting the frequency and amplitude modulated visual carrier frequency signal and the resultant frequency modulated aural carrier frequency signal.

16. A method of compatibly and simultaneously transmitting an encoded signal with the normal visual and aural carrier of a television signal comprising the steps of
generating a visual carrier frequency signal,
frequency modulating the visual carrier frequency signal over a narrow bandwidth with a source of encoded signal,
phase shifting and adding the encoded signal to a composite video signal to produce a pre-equalized signal,
amplitude modulating the frequency modulated visual carrier frequency signal with the pre-equalized signal,
generating an aural carrier frequency signal,
frequency modulating the aural carrier frequency signal with an audio signal,
mixing the frequency modulated visual carrier frequency and aural carrier frequency signals to produce a resultant frequency modulated aural carrier frequency signal, and
combining and transmitting the frequency and amplitude modulated visual carrier frequency signal and the resultant frequency modulated aural carrier frequency signal.

17. A method of compatibly and simultaneously transmitting an encoded signal with the normal visual and aural carrier of a television signal comprising the steps of
generating a visual carrier frequency signal,
frequency modulating the visual carrier frequency signal over a narrow bandwidth with a source of encoded signal,
amplitude modulating in an amplitude modulator the frequency modulated visual carrier frequency signal with a source of composite video signals,
applying a variable bias signal to the amplitude modulator, said variable bias signal being derived from said selected audio tones with a leading phase shift,
generating an aural carrier frequency signal,
frequency modulating the aural carrier frequency signal with an audio signal,
mixing the frequency modulated visual carrier frequency and aural carrier frequency signals to produce a resultant frequency modulated aural carrier frequency signal, and
combining and transmitting the frequency and amplitude modulated visual carrier frequency signal and the resultant frequency modulated aural carrier frequency signal.

18. A method of compatibly and simultaneously transmitting an encoded signal with the normal visual and aural carrier of a television signal comprising the steps of
generating a visual carrier frequency signal,
frequency modulating the visual carrier frequency signal with audio tones selected according to a source of encoded signal, said audio tones having frequencies which are substantially different than multiples of the television vertical sweep frequency,
amplitude predistorting the frequency modulated visual carrier frequency signal in a complimentary mode to the slope of the video intermediate frequency circuits of a television receiver, amplitude modulating the frequency modulated visual carrier frequency signal with a source of composite video signals,
generating an aural carrier frequency signal,
frequency modulating the aural carrier frequency signal with a audio signal,
mixing the frequency modulated visual carrier frequency and aural carrier frequency signals to produce a resultant frequency modulated aural carrier frequency signal, and
combining and transmitting the frequency and amplitude modulated visual carrier frequency signal and the resultant frequency modulated aural carrier frequency signal.

19. A method of compatibly and simultaneously transmitting an encoded signal with the normal visual and aural carrier signal of a television signal comprising the steps of
generating a visual carrier frequency signal,
frequency modulating the visual carrier frequency signal with audio tones selected according to a source of encoded signal, said audio tones having frequencies which are substantially different than multiples of the television vertical sweep frequency, amplitude modulating the frequency modulated visual carrier frequency signal with a source of composite video signals, adding a phase opposite correction signal to the composite video signals prior to amplitude modulating the frequency modulated visual carrier frequency signal such that amplitude variations which would occur in a television receiver due to the response characteristics of the receiver are preequalized, generating an aural carrier frequency signal, frequency modulating the aural carrier frequency signal with an audio signal, mixing the frequency modulated visual carrier frequency and aural carrier frequency signals to produce a resultant frequency modulated aural carrier frequency signal, and combining and transmitting the frequency and amplitude modulated visual carrier frequency signal and the resultant frequency modulated aural carrier frequency signal.

20. A method of compatibly and simultaneously transmitting an encoded signal with the normal visual and aural carrier of a television signal comprising the steps of generating a visual carrier requency signal, frequency modulating the visual carrier frequency signal with audio tones selected according to a source of encoded signal, said audio tones having frequencies which are substantially different than multiples of the television vertical sweep frequency, phase shifting and adding said selected audio tones to a composite video signal to produce a pre-equalized signal, amplitude modulating the frequency modulated visual carrier frequency signal with the pre-equalized signal, generating an aural carrier frequency signal, frequency modulating the aural carrier frequency signal with an audio signal, mixing the frequency modulated visual carrier frequency and aural carrier frequency signals to a produce a resultant frequency modulated aural carrier frequency signal, and combining and transmitting the frequency and amplitude modulated visual carrier frequency signal and the resultant frequency modulated aural carrier frequency signal.

21. A method of compatibly and simultaneously transmitting an encoded signal with the normal visual and aural carrier of a television signal comprising the steps of generating a visual carrier frequency signal, frequency modulating the visual carrier frequency signal with audio tones selected according to a source of encoded signal, said audio tones having frequencies which are substantially different than multiples of the television vertical sweep frequency, amplitude modulating in an amplitude modulator the frequency modulated visual carrier frequency signal with a source of composite video signals, applying a variable bias signal to the amplitude modulator, said variable bias signal being derived from said selected audio tones with a leading phase shift, generating an aural carrier frequency signal, frequency modulating the aural carrier frequency signal with an audio signal, mixing the frequency modulated visual carrier frequency and aural carrier frequency signals to produce a resultant frequency modulated aural carrier frequency signal, and combining and transmitting the frequency and amplitude modulated visual carrier frequency signal and the resultant frequency modulated aural carrier frequency signal.

22. A method of compatibly and simultaneously transmitting and receiving an encoded signal with the normal visual carrier of a television signal comprising the steps of generating a visual carrier frequency signal, frequency modulating the visual carrier frequency signal over a narrow bandwidth with a source of encoded signal, amplitude modulating the frequency modulated visual carrier frequency signal with a source of composite video signals such that the frequency and amplitude modulated visual carrier frequency signal is pre-equalized to compensate for amplitude variation which would occur in a television receiver due to the response characteristics of the receiver, transmitting the frequency and amplitude modulated visual carrier frequency signal, receiving the transmitted signal, and detecting the narrow band frequency modulation of said visual carrier frequency signal to reproduce the encoded signal.

23. A method of compatibly and simultaneously transmitting and receiving an encoded signal with the normal visual carrier of a television signal comprising the steps of generating a visual carrier frequency signal, frequency modulating the visual carrier frequency signal with audio tones selected according to a source of encoded signal, said audio tones having frequencies which are substantially different than multiples of the television vertical sweep frequency, amplitude modulating the frequency modulated visual carrier frequency signal with a source of composite video signals such that the frequency and amplitude modulated visual carrier frequency signal is pre-equalized to compensate for amplitude variation which would occur in a television receiver due to the response characteristics of the receiver, transmitting the frequency and amplitude modulated visual carrier frequency signal, receiving the transmitted signal, and detecting the frequency modulation of said visual carrier frequency signal to reproduce the encoded signal.

24. The method of transmitting and receiving as recited in claims 22 or 23, further comprising the step of aurally reproducing the detected encoded signal.

25. The method of transmitting and receiving as recited in claims 22 or 23 further comprising the step of decoding the detected encoded signal.

26. The method of transmitting and receiving as recited in claims 22 or 23, further comprising tbe step of displaying the detected encoded signal.

27. The method of transmitting and receiving as recited in claims 22 or 23, further comprising the step of recording the detected encoded signal.

28. The method of transmitting and receiving as recited in claims 22 or 23, further comprising the steps of
 decoding the detected encoded signal, and
 displaying the decoded signal.

29. The method of transmitting and receiving recited in claims 22 or 23, further comprising the steps of
 decoding the detected encoded signal, and
 recording the decoded signal.

30. A transmitter for compatibly and simultaneously transmitting an encoded signal with the normal visual carrier of a television signal comprising:
 means for generating a visual carrier frequency signal,
 means for frequency modulating the visual carrier frequency signal over a narrow bandwidth with a source of encoded signal,
 means for amplitude modulating the frequency modulated video signals, and
 means for transmitting the frequency and amplitude modulated visual carrier frequency signal.

31. A transmitter for compatibly and simultaneously transmitting an encoded signal with the normal visual carrier of a television signal comprising:
 means for generating a visual carrier frequency signal,
 means for frequency modulating the visual carrier frequency signal with audio tones selected according to a source of encoded signal, said audio tones having frequencies which are substantially different than multiples of the television vertical sweep frequency,
 means for amplitude modulating the frequency modulated visual carrier frequency signal with a source of composite video signals, and
 means for transmitting the frequency and amplitude modulated visual carrier frequency signal.

32. A transmitter for compatibly and simultaneously transmitting an encoded signal with the normal visual carrier of a television signal comprising:
 means for generating a visual carrier frequency signal,
 means for frequency modulating the visual carrier frequency signal over a narrow bandwidth with a source of encoded signal,
 means for amplitude predistorting the frequency modulated visual carrier frequency signal in a complimentary mode to the slope of the video intermediate frequency circuit of a television receiver,
 means for amplitude modulating the frequency modulated and predistorted visual carrier frequency signal with a source of composite video signals, and
 means for transmitting the frequency and amplitude modulated visual carrier frequency signals.

33. A transmitter for compatibly and simultaneously transmitting an encoded signal with the normal visual carrier of a television signal comprising:
 means for generating a visual carrier frequency signal,
 means for frequency modulating the visual carrier frequency signal over a narrow bandwidth with a source of encoded signal,
 means for amplitude modulating the frequency modulated visual carrier frequency signal with a source of composite video signals,
 means for adding a phase opposite correction signal to the composite video signals prior to amplitude modulating the frequency modulated visual carrier frequency signal such that amplitude variations which would occur in a television receiver due to the response characteristics of the receiver are pre-equalized, and
 means for transmitting the frequency and amplitude modulated visual carrier frequency signal.

34. A transmitter for compatibly and simultaneously transmitting an encoded signal with the normal visual carrier of a television signal comprising:
 means for generating a visual carrier frequency signal,
 means for frequency modulating the visual carrier frequency signal over a narrow bandwidth with a source of encoded signal,
 means for phase shifting and adding the encoded signal to a composite video signal to produce a pre-equalized signal,
 means for amplitude modulating the frequency modulated visual carrier frequency signal with the pre-equalized signal, and
 means for transmitting the frequency and amplitude modulated visual carrier frequency signal.

35. A transmitter for compatibly and simultaneously transmitting an encoded signal with the normal visual carrier of a television signal comprising:
 means for generating a visual carrier frequency signal,
 means for frequency modulating the visual carrier frequency signal over a narrow bandwidth with a source of encoded signal,
 means for amplitude modulating in an amplitude modulator the frequency modulated visual carrier frequency signal with a source of composite video signals,
 means for applying a variable bias signal to the amplitude modulator, said variable bias signal being derived from the source of encoded signal with a leading phase shift, and
 means for transmitting the frequency and amplitude modulated visual carrier frequency signal.

36. A transmitter for compatibly and simultaneously transmitting an encoded signal with the normal visual carrier of a television signal comprising:
 means for generating a visual carrier frequency signal,
 means for frequency modulating the visual carrier frequency signal with audio tones selected according to a source of encoded signal, said audio tones having frequencies with are substantially different than multiples of the television vertical sweep frequency,
 means for amplitude predistorting the frequency modulated visual carrier frequency signal in a complimentary mode to the slope of the video intermediate frequency circuit of a television receiver,
 means for amplitude modulating the frequency modulated and predistorted visual carrier frequency signal with a source of composite video signals, and
 means for transmitting the frequency and amplitude modulated visual carrier frequency signals.

37. A transmitter for compatibly and simultaneously transmitting an encoded signal with the normal visual carrier of a television signal comprising:
 means for generating a visual carrier frequency signal,
 means for frequency modulating the visual carrier frequency signal with audio tones selected according to a source of encoded signal, said audio tones having frequencies which are substantially different than multiples of the television vertical sweep frequency, means for amplitude modulating the frequency modulated visual carrier frequency signal with a source of composite video signals, means for adding a phase opposite correction signal to the composite video signals prior to amplitude modulating the frequency modulated visual carrier frequency signal such that amplitude variations which would occur in a television receiver due to the response characteristics of the receiver are pre-equalized, and means for transmitting the frequency and amplitude modulated visual carrier frequency signal.

38. A transmitter for compatibly and simultaneously transmitting an encoded signal with the normal visual carrier of a television signal comprising:

means for generating a visual carrier frequency signal, means for frequency modulating the visual carrier frequency signal with audio tones selected according to a source of encoded signal, said audio tones having frequencies which are substantially different than multiples of the television vertical sweep frequency, means for phase shifting and adding said selected audio tones to a composite video signal to produce a pre-equalized signal, means for amplitude modulating the frequency modulated visual carrier frequency signal with the pre-equalized signal, and means for transmitting the frequency and amplitude modulated visual carrier frequency signal.

39. A transmitter for compatibly and simultaneously transmitting an encoded signal with the normal visual carrier of a television signal comprising:

means for generating a visual carrier frequency signal, means for frequency modulating the visual carrier frequency signal with audio tones selected according to a source of encoded signal, said audio tones having frequencies which are substantially different than multiples of the television vertical sweep frequency, means for amplitude modulating an amplitude modulator the frequency modulated visual carrier frequency signal with a source of composite video signals, means for applying a variable bias signal to the amplitude modulator, said variable bias signal being derived from the source of encoded signal with a leading phase shift, and means for transmitting the frequency and amplitude modulated visual carrier frequency signal.

40. A transmitter for compatibly and simultaneously transmitting an encoded signal with the normal visual and aural carrier of a television signal comprising:

means for generating a visual carrier frequency signal, means for frequency modulating the visual carrier frequency signal over a narrow bandwidth with a source of encoded signal, means for amplitude modulating the frequency modulated visual carrier frequency signal with a source of composite video signals, means for generating an aural carrier frequency signal, means for frequency modulating the aural carrier frequency signal with an audio signal, means for mixing the frequency modulated visual carrier frequency and aural carrier frequency signals to produce a resultant frequency modulated aural carrier frequency signal, and means for combining and transmitting the frequency and amplitude modulated visual carrier frequency signal and the resultant frequency modulated aural carrier frequency signal.

41. A transmitter for compatibly and simultaneously transmitting an encoded signal with the normal visual and aural carrier of a television signal comprising:

means for generating a visual carrier frequency signal, means for frequency modulating the visual carrier frequency signal with audio tones selected according to a source of encoded signal, said audio tones having frequencies which are substantially different than multiples of the television vertical sweep frequency, means for amplitude modulating the frequency modulated visual carrier frequency signal with a source of composite video signals, means for generating an aural carrier frequency signal, means for frequency modulating the aural carrier frequency signal with an audio signal, means for mixing the frequency modulated visual carrier frequency and aural carrier frequency signals to produce a resultant frequency modulated aural carrier frequency signal, and means for combining and transmitting the frequency and amplitude modulated visual carrier frequency signal and the resultant frequency modulated aural carrier frequency signal.

42. A transmitter for compatibly and simultaneously transmitting an encoded signal with the normal visual and aural carrier of a television signal comprising:

means for generating a visual carrier frequency signal, means for frequency modulating the visual carrier frequency signal over a narrow bandwidth with a source of encoded signal, means for amplitude predistorting the frequency modulated visual carrier frequency signal in a complimentary mode to the slope of the video intermediate frequency circuits of a television receiver, means for amplitude modulating the frequency modulated visual carrier frequency signal with a source of composite video signals, means for generating an aural carrier frequency signal, means for frequency modulating the aural carrier frequency signal with an audio signal, means for mixing the frequency modulated visual carrier frequency and aural carrier frequency signals to produce a resultant frequency modulated aural carrier frequency signal, and means for combining and transmitting the frequency and amplitude modulated visual carrier frequency signal and the resultant frequency modulated aural carrier frequency signal.

43. A transmitter for compatibly and simultaneously transmitting an encoded signal with the normal visual and aural carrier of a television signal comprising:

means for generating a visual carrier frequency signal, means for frequency modulating the visual carrier frequency signal over a narrow bandwidth with a source of encoded signal, means for amplitude modulating the frequency modulated visual carrier frequency signal with a source of composite video signals, means for adding a phase opposite correction signal to the composite video signals prior to amplitude modulating the frequency modulated visual carrier frequency signal such that amplitude variations which would occur in a television receiver due to the response characteristics of the receiver are pre-equalized, means for generating an aural carrier frequency signal, means for frequency modulating the aural carrier frequency signal with an audio signal, means for mixing the frequency modulated visual carrier frequency and aural carrier frequency signals to produce a resultant frequency modulated aural carrier frequency signal, and means for combining and transmitting the frequency and amplitude modulated visual carrier frequency signal and the resultant frequency modulated aural carrier frequency signal.

44. A transmitter for compatibly and simultaneously transmitting an encoded signal with the normal visual and aural carrier of a television signal comprising:

means for generating a visual carrier frequency signal, means for frequency modulating the visual carrier frequency signal over a narrow bandwidth with a source of encoded signal, means for phase shifting and adding the encoded signal to a composite video signal to produce a pre-equalized signal, means for amplitude modulating the frequency modulated visual carrier frequency signal with the pre-equalized signal, means for generating an aural carrier frequency signal, means for frequency modulating the aural carrier frequency signal with an audio signal, means for mixing the frequency modulated visual carrier frequency and aural carrier frequency signals to produce a resultant frequency modulated aural carrier frequency signal, and means for combining and transmitting the frequency and amplitude modulated visual carrier frequency signal and the resultant frequency modulated aural carrier frequency signal.

45. A transmitter for compatibly and simultaneously transmitting an encoded signal with the normal visual and aural carrier of a television signal comprising:

means for generating a visual carrier frequency signal, means for frequency modulating the visual carrier frequency signal over a narrow bandwidth with a source of encoded signal, means for amplitude modulating in an amplitude modulator the frequency modulated visual carrier frequency signal with a source of composite video signals, means for applying a variable biase signal to the amplitude modulator, said variable bias signal being derived from the source of encoded signal with the leading phase shift, means for generating an aural carrier frequency signal, means for frequency modulating the aural carrier frequency signal with an audio signal, means for mixing the frequency modulated visual carrier frequency and aural carrier frequency signals to produce a resultant frequency modulated aural carrier frequency signal, and means for combining and transmitting the frequency and amplitude modulated visual carrier frequency signal and the resultant frequency modulated aural carrier frequency signal.

46. A transmitter for compatibly and simultaneously transmitting an encoded signal with the normal visual and aural carrier of a television signal comprising:

means for generating a visual carrier frequency signal, means for frequency modulating the visual carrier frequency signal with audio tones selected according to a source of encoded signal, said audio tones having frequencies which are substantially different than multiplies of the television vertical sweep frequency, means for amplitude predistorting the frequency modulated visual carrier frequency signal in a complimentary mode to the slope of the video intermediate frequency circuits of a television receiver, amplitude modulating the frequency modulated visual carrier frequency signal with a source of composite video signals, means for generating an aural carrier frequency signal, means for frequency modulating the aural carrier frequency signal with an audio signal, means for mixing the frequency modulated visual carrier frequency and aural carrier frequency signals to produce a resultant frequency modulated aural carrier frequency signal, and means for combining and transmitting the frequency and amplitude modulated visual carrier frequency signal and the resultant frequency modulated aural carrier frequency signal.

47. A transmitter for compatibly and simultaneously transmitting an encoded signal with the normal visual and aural carrier of a television signal comprising:

means for generating a visual carrier frequency signal, means for frequency modulating the visual carrier frequency signal with audio tones selected according to a source of encoded signal, said audio tones having frequencies which are substantially different than multiplies of the television vertical sweep frequency, means for amplitude modulating the frequency modulated visual carrier frequency signal with a source of composite video signals, means for adding a phase opposite correction signal to the composite video signals prior to amplitude modulating the frequency modulated visual carrier frequency signal such that amplitude variations which would occur in a television receiver due to the response characteristics of the receiver are pre-equalized, means for generating an aural carrier frequency signal, means for frequency modulating the aural carrier frequency signal with an audio signal, means for mixing the frequency modulated visual carrier frequency and aural carrier frequency signals to produce a resultant frequency modulated aural carrier frequency signal, and means for combining and transmitting the frequency and amplitude modulated visual carrier frequency signal and the resultant frequency modulated aural carrier frequency signal.

48. A transmitter for compatibly and simultaneously transmitting an encoded signal with the normal visual and aural carrier of a television signal comprising:

means for generating a visual carrier frequency signal, means for frequency modulating the visual carrier frequency signal with audio tones selected according to a source of encoded signal, said audio tones having frequencies which are substantially different than multiples of the television vertical sweep frequency, means for phase shifting and adding said selected audio tones to a composite video signal to produce a pre-equalized signal, means for amplitude modulating the frequency modulated visual carrier frequency signal with the pre-equalized signal, means for generating an aural carrier frequency signal, means for frequency modulating the aural carrier frequency signal with an audio signal, means for mixing the frequency modulated visual carrier frequency and aural carrier frequency signals to produce a resultant frequency modulated aural carrier frequency signal, and means for combining and transmitting the frequency and amplitude modulated visual carrier frequency signal and the resultant frequency modulated aural carrier frequency signal.

49. A transmitter for compatibly and simultaneously transmitting an encoded signal with the normal visual and aural carrier of a television signal comprising:

means for generating a visual carrier frequency signal, means for frequency modulating the visual carrier frequency signal with audio tones selected according to a source of encoded signal, said audio tones having frequencies which are substantially different than multiples of the television vertical sweep frequency, means for amplitude modulating in an amplitude modulator the frequency modulated visual carrier frequency signal with a source of composite video signals, means for applying a variable bias signal to the amplitude modulator, said variable bias signal being derived from said selected audio tones with a leading phase shift, means for generating an aural carrier frequency signal, means for frequency modulating the aural carrier frequency signal with an audio signal, means for mixing the frequency modulated visual carrier frequency and aural carrier frequency signals to produce a resultant frequency modulated aural carrier frequency signal, and means for combining and transmitting the frequency and amplitude modulated visual carrier frequency signal and the resultant frequency modulated aural carrier frequency signal.

* * * * *